US005160837A

United States Patent [19]

Hirane et al.

[11] Patent Number: 5,160,837

[45] Date of Patent: Nov. 3, 1992

[54] LIGHT EMITTER ARRAY DIAGNOSTIC APPARATUS

[75] Inventors: Hideo Hirane, Hitachi; Kiyohiko Tanno, Katsuta; Kazuhito Masuda, Hitachi, all of Japan

[73] Assignees: Hitachi, Ltd.; Hitachi Cable Ltd., both of Tokyo, Japan

[21] Appl. No.: 669,957

[22] Filed: Mar. 15, 1991

[30] Foreign Application Priority Data

Mar. 15, 1990 [JP] Japan ........................ 2-62669

[51] Int. Cl.[5] ........................ G01D 21/04; G01D 9/04

[52] U.S. Cl. ........................ 250/208.2; 250/221

[58] Field of Search ........................ 250/208.2, 221; 340/659

[56] References Cited

U.S. PATENT DOCUMENTS

| | | | |
|---|---|---|---|
| 3,742,222 | 6/1973 | Endl | 250/208.2 |
| 3,970,846 | 7/1976 | Schofield et al. | 250/208.2 |
| 4,520,262 | 5/1985 | Denton | 250/221 |
| 4,645,920 | 2/1987 | Carroll et al. | 250/222.1 |
| 4,652,741 | 3/1987 | Golborne et al. | 250/222.1 |
| 4,672,195 | 6/1987 | Golborne et al. | 250/222.1 |
| 4,780,731 | 10/1988 | Creutzmann et al. | 346/108 |
| 4,893,120 | 1/1990 | Doering et al. | 250/221 |
| 5,015,840 | 5/1991 | Blau | 250/221 |
| 5,049,735 | 9/1991 | Kitajima et al. | 250/208.2 |

FOREIGN PATENT DOCUMENTS

| | | |
|---|---|---|
| 297603 | 1/1989 | European Pat. Off. . |
| 3534338 | 4/1987 | Fed. Rep. of Germany . |
| 61-264361 | 11/1986 | Japan . |
| 61-264362 | 11/1986 | Japan . |
| 62-270350 | 11/1987 | Japan . |
| 63-25066 | 2/1988 | Japan . |

*Primary Examiner*—Bruce C. Anderson

*Attorney, Agent, or Firm*—Antonelli, Terry, Stout & Kraus

[57] ABSTRACT

A light emitter array diagnostic apparatus for diagnosing whether individual light emitter elements in a light emitter array unit normally emit light or not includes a check data generator which supplied check data so as to cause sequential simultaneous emission of light from at least one light emitter element in each of a plurality of groups of the light emitter array unit divided into such groups, until all of the light emitter elements emit light. The light outputs from the individual light emitter elements are received and photoelectrically converted by photo detector units, and a diagnostic unit connected to the photo detector units and including an adder and/or a comparator diagnoses the state of luminescence of the individual light emitter elements.

20 Claims, 9 Drawing Sheets

LIGHT EMITTER ARRAY DIAGNOSTIC APPARATUS

BACKGROUND OF THE INVENTION

This invention relates to an optical recording apparatus such as an optical printer whose light source is a light emitter array, and more particularly to a diagnostic apparatus for diagnosing whether or not light emitter elements forming the light emitter array in the optical printer are satisfactorily or normally emitting light.

A conventional optical printer having a light emitting diode (LED) array as its light source has a structure as schematically shown in FIG. 10. Referring to FIG. 10, data to be recorded is supplied from a host computer 100 to an LED array printer 200. This LED array printer 200 is generally composed of a driver circuit 201, an LED array 202, an image focusing lines array 203 and a photoconductive drum 204. The data is supplied in a digital form so as to selectively cause emission of light from corresponding LED elements (not shown) in the LED array 202. In this case, data corresponding to one line is sequentially supplied from the host computer 100 to cover all of the LED elements arrayed to form the LED array 202. The data supplied from the host computer 100 is subjected to serial-parallel conversion in the driver circuit 201 so as to selectively cause emission of light from the LED elements in the LED array 202 according to the data supplied from the host computer 100. Light emitted from the energized LED elements among those forming the LED array 202 is focused by the focusing lens array 203 to form a dot image on the photoconductive drum 204. Such a manner of line sequential scanning for causing emission of light from selected LED elements is continued so as to sequentially form a dot image on the photoconductive drum 204 being rotated. Thus, character, pattern or like images are recorded on the photoconductive drum 204. The dot images formed on the photoconductive drum 204 are then transfer printed on a sheet of paper by a method such as an electrostatic recording method.

When the luminance of any one or more of the LED elements forming the LED array 202 is subject to a variation, it leads to the problem that the optical density of the recorded image is not maintained constant, and the image quality will be greatly impaired or degraded. Such a variation in the luminance of emission is attributable to various factors including the temperature, corruption and secular variation. An attempt to deal with such a problem is disclosed in, for example, JP-A-61-264361 which discloses that the quantity of light emitted from an LED array is detected by a luminous power sensor, and the period of time of emission from the LED array is controlled on the basis of the result of the luminous power detection so as to maintain constant the quantity of light emitted from the LED array. On the other hand, JP-A-62-270350 and JP-A-63-25066 disclose a method for deciding whether an LED element is normal or not. According to the disclosures of these two patent applications, a resistor is connected in series with an LED element to be inspected, and this LED element is decided to be normal by detecting current which flows through the resistor in response to the energization of this LED element.

However, JP-A-61-264361 cited above does not refer to the case where any one of the LED elements in the LED array does not emit light due to, for example, disconnection of its power supply lead and does not also refer to the detection of the quantity of light emitted from each of the LED elements.

On the other hand, when any one of the LED elements becomes faulty, the corresponding portion of the dot image drops out. In such a case, the problem is more serious than the case of a non-uniform image density distribution in that the information will not be sometimes correctly recorded. Therefore, it is necessary to diagnose whether or not any one of the LED elements in the LED array becomes faulty in the state in which the LED array is incorporated in a printer. JP-A-62-270350 and JP-A-63-25066 cited above meet such a demand. However, it is impractical to connect one resistor in series with each of the many LED elements in the LED array printer. Although employment of a switching means may be preferable for decreasing the number of the series resistors, this method is also impractical in that the structure of the switching means becomes complex in itself.

SUMMARY OF THE INVENTION

With a view to solve all of the prior art problems pointed out above, it is an object of the present invention to provide a light emitter array diagnostic apparatus which can detect a faulty light emitter element, if any, by diagnosing all of light emitter elements in a light emitter array within a short period of time.

The present invention provides a light emitter array diagnostic apparatus which comprises a light emitter array unit, a photo detector unit disposed in the emission space of the light emitter array opposite to the light emitting surface of the light emitter array and divided into a plurality of photo detector units electrically connected in series, a check data generator unit supplying check data to the light emitter array unit divided into a plurality of blocks corresponding to the respective photo detector units at the time of emission diagnosis so as to sequentially select one light emitter element from each of the blocks and to cause simultaneous emission of light from the selected light emitter elements and a diagnostic unit sequentially comparing a reference signal with a signal appearing across output terminals of the series-connected photo detector units at the time of the emission diagnosis, and, when the level of the output signal of the series-connected photo detector units is lower than that of the reference signal, diagnosis that at least one of the light emitter elements which should simultaneously emit light is faulty.

In another embodiment of the present invention, an output terminal is provided for each of the photo detector units in lieu of electrically connecting all of the photo detector units in series, and a signal appearing from each of the output terminals is compared with the reference signal.

In still another embodiment of the present invention, an output terminal is provided for each of the photo detector units in lieu of electrically connecting all of the photo detector units in series, and the sum of the signals appearing from all of the output terminals is compared with the reference signal.

In yet another embodiment of the present invention, odd-numbered ones and even-numbered ones of the photo detector units are separately connected in series respectively in lieu of electrically connecting all of the photo detector units in series, and odd-numbered output terminals and even-numbered output terminals are separately provided so that signals appearing from these output terminals are diagnosed in a time series node.

In a further embodiment of the present invention, the photo detector unit is not divided into the plural photo detector units and remains in a single unit.

In still further embodiment of the present invention, the single photo detector unit is replaced by two photo detector units disposed at different positions.

According to one embodiment of the present invention, the photo detector unit is divided into the plural photo detector units each of which receives light emitted from at least one light emitter element in the corresponding block of the light emitter unit so that the emission diagnosis for all of the light emitter elements forming the light emitter array can be attained at a high speed.

Further, according to another embodiment of the present invention, the photo detector unit is not divided but remains in the single unit, so that, by merely comparing the signal appearing from the single output terminal of the photo detector unit, the emission diagnosis for all of the light emitter elements forming the light emitter array can be attained at a high speed.

DESCRIPTION OF THE PREFERRED EMBODIMENTS

Preferred embodiments of the present invention will now be described in detail with reference to the accompanying drawings.

Figure 1:
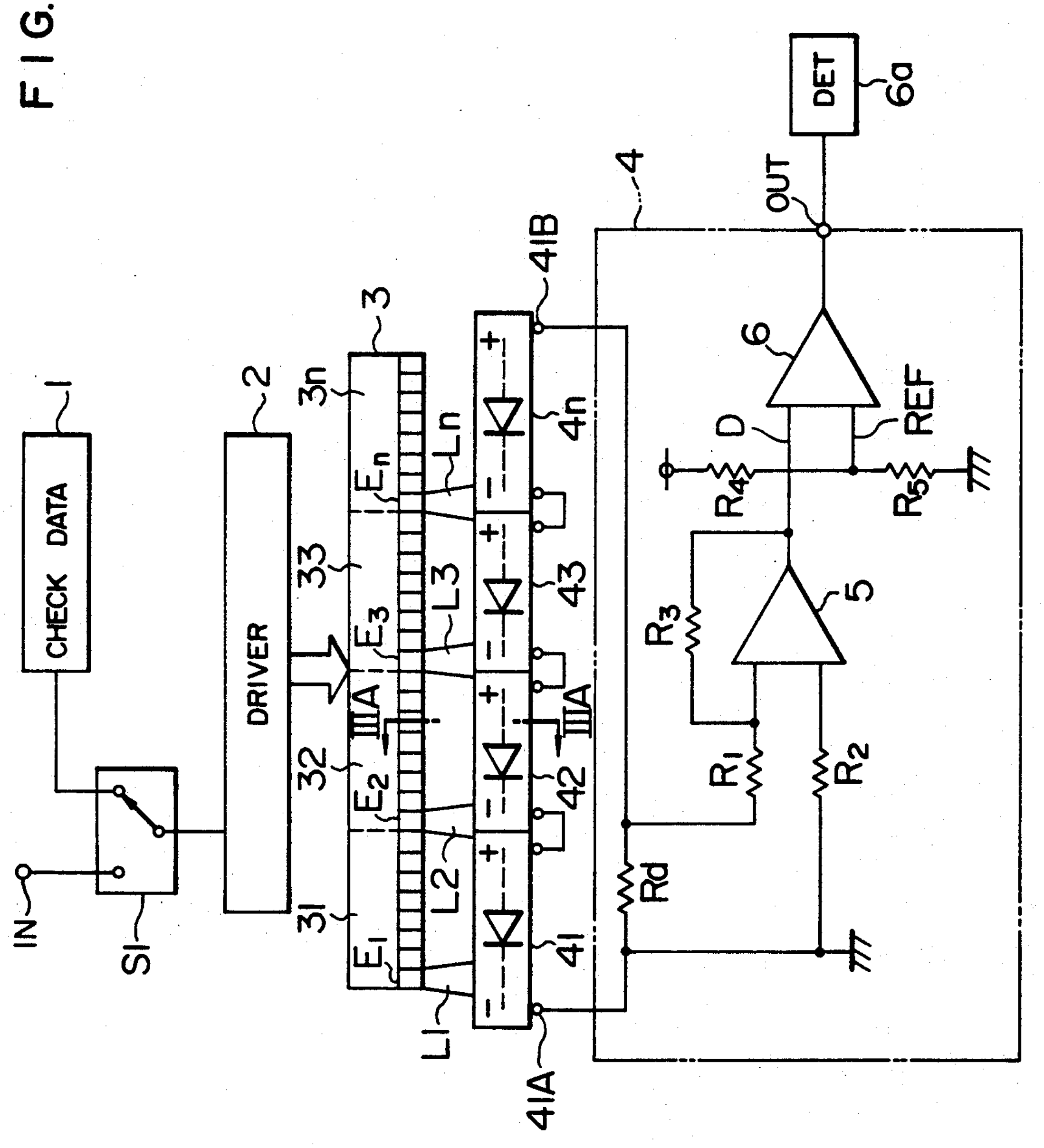
FIG. 1 is a diagrammatic view showing the structure of a first embodiment of the light emitter array diagnostic apparatus according to the present invention.

FIG. 1 shows a first embodiment of the light emitter array diagnostic apparatus according to the present invention. Referring to FIG. 1, the light emitter array diagnostic apparatus comprises a check data generator 1 acting as a check data supply unit, a driver circuit 2, an LED array 3 which is a light emitter array unit, a faulty LED element detector 4 acting as a diagnostic unit, a plurality of photo diodes 41, 42, 43, . . . , 4n, each of which is a photo detector unit, an amplifier 5, a comparator 6, a decision circuit *6a*, an image data input terminal IN, and a switching unit S1.

The LED array 3 consisting of several thousand LED elements is divided into a plurality of groups 31, 32, 33, . . . , 3n each having the same number of LED elements. The LED array 3 is divided into such groups for the sake of convenience only, and this manner of grouping does not in any way limit the arrangement of the LED elements forming the LED array 3. The check data generator 1 generates check data so as to diagnose as to whether or not any one of the LED elements forming the LED array 3 is faulty and fails to normally emit light. It is necessary to detect whether or not each of the LED elements forming the LED array 3 emits light by actuating LED elements. However, when most of the many LED elements forming the LED array 3 are simultaneously emitting light, it is impossible to identify one or more LED elements which are faulty and fail to normally emit light. Therefore, it is necessary to limit the number of the LED elements which are simultaneously energized and to divide the emission detection into a plurality of scanning steps. In the first embodiment of the present invention, the check data generator 1 supplies check data in each scanning step so that at least one LED element in each of the groups 31, 32, 33, . . . , 3n forming the LED array 3 is energized to emit light in response to the check data. Thus, in one scanning step, one LED element in each of the groups 31, 32, 33, . . . , 3n, that is, a total of n LED elements are simultaneously energized to emit light. In the next scanning step, LED elements different from those energized in the preceding scanning step in the respective groups are simultaneously energized to emit light. The check data generator 1 repeatedly generates the check data a plurality of times until all of the LED elements constituting the LED array 3 are energized to emit light.

The check data is such that a plurality of LED elements are scanned by a scanning signal to cause simultaneous emission of light from these LED elements. Practical examples of the manner of scanning and the check data will now be described.

For simplicity of description, all of the linearly arranged LED elements are numbered (1, 1), (1, 2), . . . , (2, 1), (2, 2), . . . , (m, n) in the order of from the leftmost one in FIG. 1. Therefore, the number of the LED elements can be expressed as $(m \times n)$, where m represents the number of columns, and n represents the number of rows. That is, these LED elements are grouped into m groups each including n LED elements in the LED array 3. Therefore, the LED element numbers belonging to the first to the m-th group respectively are as follows:

$$\left.\begin{array}{lcccc} \text{First group:} & (1, 1), & (1, 2), & \ldots, & (1, n) \\ \text{Second group:} & (2, 1), & (2, 2), & \ldots, & (2, n) \\ \cdot & \cdot & \cdot & & \cdot \\ \cdot & \cdot & \cdot & \cdots & \cdot \\ \cdot & \cdot & \cdot & & \cdot \\ M\text{-th group:} & (m, 1), & (m, 2), & \ldots, & (m, n) \end{array}\right\} \quad (1)$$

According to the above manner of grouping, the LED elements having the following numbers are scanned in the first to the n-th scanning steps, respectively:

$$\left.\begin{array}{lcccc} \text{First scanning:} & (1, 1), & (2, 1), & \ldots, & (m, 1) \\ \text{Second scanning:} & (1, 2), & (2, 2), & \ldots, & (m, 2) \\ \cdot & \cdot & \cdot & & \cdot \\ \cdot & \cdot & \cdot & \cdots & \cdot \\ \cdot & \cdot & \cdot & & \cdot \\ n\text{-th scanning:} & (1, n), & (2, n), & \ldots, & (m, n) \end{array}\right\} \quad (2)$$

Thus, according to the above manner of scanning, the LED elements numbered (1, 1), (2, 1), . . . , (m, 1) are selected at the time of the first scanning, and these m LED elements are simultaneously energized to emit light in response to the check data. After this first scanning, the second scanning starts, and, in the second scanning, the LED elements numbered (1, 2), (2, 2), . . . , (m, 2) are selected and simultaneously energized to emit light in response to the check data. Thereafter, the sequential scanning continues until the n-th scanning is completed. In this manner, all of the LED elements are energized to emit light for the purpose of the emission diagnosis.

There are various forms for supplying the check data, as described below.

(1) In one form, the check data representing the element numbers (the addresses) of the LED elements to be simultaneously scanned is sequentially generated from the check data generator 1. In this case, the check data representing the element numbers (the addresses) of the LED elements numbered (1, 1), (2, 1), . . . , (m, 1) is sequentially generated in the first scanning. At this time, emission data "1" for the diagnostic purpose is added to the element numbers (the addresses) of the LED elements to be scanned. The same applies to the second and succeeding scanning.

(2) The emission data "1" is directly generated to indicate each of the element numbers of the LED elements to be simultaneously scanned. For example, at the time of the first scanning for the LED elements numbered (1, 1), (2, 1), . . . , (m, 1), the check data generator 1 generates data "1", but generates data "0" for the remaining LED elements having the other element numbers, as follows:

| (1, 1) | | (2, 1) | | (3, 1) | | (m, 1) | | |
|---|---|---|---|---|---|---|---|---|
| 100 | . . . | 0100 | . . . | 01 | . . . | 100 | . . . | 0 |

As the time of the second scanning, the check data pattern generated from the check data generator 1 is as follows:

| (1, 2) | | (2, 2) | | (3, 2) | | (m, 2) | | |
|---|---|---|---|---|---|---|---|---|
| 010 | . . . | 0010 | . . . | 0010 | . . . | 010 | . . . | 0 |

The check data generator 1 continuously generates similar check data patterns until the end of the n-th scanning.

(3) The check data generator 1 generates and supplies check data of 1-bit only to the driver circuit 2, and a separate scanning circuit carries out the scanning according to the scanning mode given by the expression (2).

(4) There are various other manners of supplying the check data. In such a case too, it is the essential requirement that the LED elements in the LED array 3 are to be scanned according to the scanning mode given by the expression (2). For this purpose, both the check data generator 1 and the driver circuit 2 may have structures different from those shown in FIG. 1.

The driver circuit 2 is composed of an (m×n)-bit register and drive means. When the check data having a pattern as described in (2) is supplied from the check data generator 1, the check data is subjected to serial-parallel conversion in the driver circuit 2, so that the LED elements selected by the emission data are simultaneously energized to emit light. Suppose, for example, that the emission data for causing simultaneous emission of light from LED elements $E_1$, $E_2$, $E_3$, . . . , $E_n$ located at the left ends of the respective groups 31, 32, 33, . . . , 3n of the LED array 3 is supplied to the driver circuit 2 at the time of certain scanning. The emission data is subjected to the serial-parallel conversion in the driver circuit 2 so as to simultaneously energize the LED elements $E_1$, $E_2$, $E_3$, . . . , $E_n$. As a result, light outputs $L_1$, $L_2$, $L_3$, . . . , $L_n$ appear from these LED elements, respectively.

The photoelectric transducer connected to the faulty LED element detector 4 has such a structure that the plural photo diodes 41, 42, 43, ..., 4n each having a short length corresponding to the associated group of the LED array 3 (which diodes will be referred to hereinafter as short-size photo diodes) are electrically connected in series to extend along the full length of the LED array 3. Each of these short-size photo diodes 41, 42, 43, . . . , 4n is disposed at the position where it can receive light emitted from whatever LED element belonging to the associated groups 31, 32, 33, . . . , 3n of the LED array 3.

Each of these short-size photo diodes 41, 42, 43, . . . , 4n has a light receiving surface having a wide area capable of receiving light emitted from any one of the LED elements belonging to the associated groups 31, 32, 33, . . . , 3n of the LED array 3. Such a short-size photo diode can be equivalently replaced by a voltaic cell when the diode is conducting, and it can be replaced by an insulator when the diode is not conducting. Therefore, when any one of the series-connected photo diode corresponding to any one of the groups 31, 32, 33, . . . , 3n of the LED array 3 is not receiving emission, no photovoltage appears across output terminals 41A and 41B of the series connection.

Figure 2:
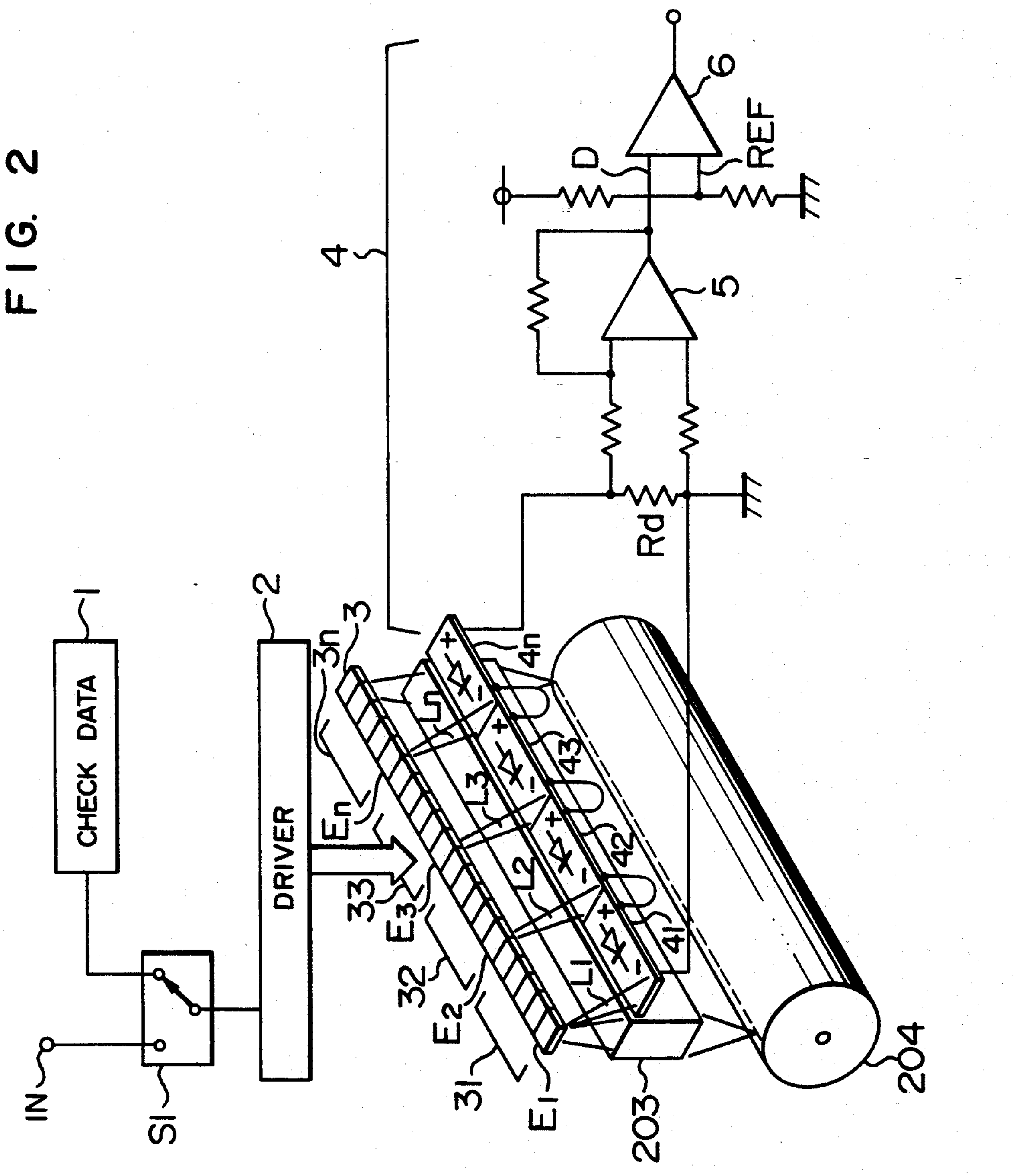
FIG. 2 is a schematic perspective view of the first embodiment of the present invention shown in FIG. 1.

FIG. 2 is a schematic perspective view of the first embodiment of the present invention, and, in FIG. 2, the LED array 3, the short-size photo diodes 41 to 4n, the focusing lens array 203 and the photoconductive drum 204 are emphasized. Referring to FIG. 2, the short-size photo diodes 41 to 4n are disposed in close proximity and parallel to the focusing lens array 203. The short-size photo diode 41 receives light emitted from the LED elements belonging to the group 31, and the short-size photo diode 42 receives light emitted from the LED elements belonging to the group 32. The same applies to the relation between the remaining photo diodes and the remaining groups.

Figure 3A:
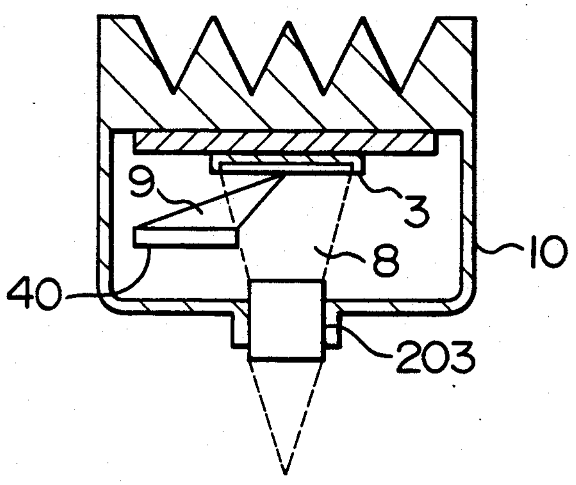
FIGS. 3A and 3B show two forms respectively of the photo diode arrangement employed in the present invention.
Figure 3B:
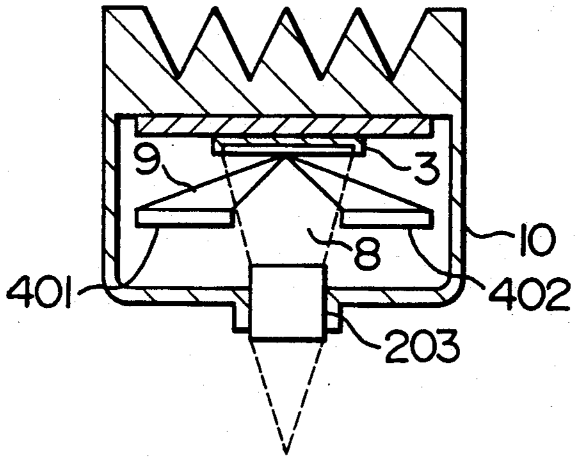

FIG. 3A is a schematic sectional view taken along the line IIIA—IIIA in FIG. 1. FIG. 3B is a sectional view of another form corresponding to FIG. 3A. Each of FIGS. 3A and 3B shows that, among the plural LED elements, a specific one supplied with the check data is emitting light. FIG. 3A shows that the light output from the LED array 3 passes through an optical path 8 shown by the dotted lines to be transmitted through the focusing lens array 203. Similarly, FIG. 3B shows that the light output passes through a similar optical path 8 to be transmitted through a focusing lens array 203. In each of FIGS. 3A and 3B, the reference numeral 10 designates a light shielding case which is not shown in FIGS. 1 and 2. In FIG. 3A, the short-size photo diode 40 is disposed in the light shielding case 10 at a position outside of the optical path 8 along which the light output from the LED array 3 generally passes to be transmitted through the focusing lens array 203. That is, the short-size photo diode 40 is disposed at a position where it receives the light output 9 from the LED array 3. In the case of FIG. 3B, short-size photo diode 401 corresponding to odd-numbered group (for example, groups 31, 33) of LED array 3 and short-size photo diode 402 corresponding to even-numbered group (for example, group 32, 34) of LED array 3 are disposed on both sides respectively of the optical path 8 when viewed from the focusing lens array 203.

The response time of each of the short-size photo diodes 41, 42, 43, . . . , 4n shown in FIG. 1 is generally greatly dependent on its junction capacitance. Suppose that C is the junction capacitance of each of these short-size photo diodes 41, 42, 43, . . . , 4n. In the diode arrangement where these photo diodes 41, 42, 43, . . . , 4n are connected in series, the overall electrostatic capacity when viewed from the detection output terminals 41A and 41B is given by C/n, where n is the number of the photo diodes. When the LED array 3 does not include a faulty LED element, the short-size photo diodes 41, 42, 43, . . . , 4n receive the light outputs $L_1$, $L_2$, $L_3$, . . . , $L_n$ of the same light quantity from the LED elements $E_1$, $E_2$, $E_3$, . . . , $E_n$ respectively. Therefore, photovoltages of the same quantity are induced in the respective short-size photo diodes 41, 42, 43, . . . , 4n, and a detection resistor Rd detects the sum of the photovoltages. The amplifier 5 has input resistors $R_1$, $R_2$ and a resistor $R_3$ connected across its input and output terminals. The voltage detected by the detection resistor Rd is amplified by the amplifier 5 up to a level of about several volts.

When the LED array 3 includes a faulty LED element, the overall photovoltage is correspondingly decreased to decrease the voltage detected by the detection resistor Rd. In order to generate an error signal, when any one of the LED elements simultaneously energized to emit light at the time of each scanning step is faulty, it is necessary to identify the faulty LED element on the basis of the detected voltage variation attributable to the faulty LED element. The comparator 6 is provided for the purpose of this identification. Also, when any one of the LED elements does not emit light, the short-size photo diode associated with the faulty LED element is not active, and a zero output appears across its output terminals. Even when that LED element does not emit light, light emitted from the LED element belonging to the group other than the group to which the faulty LED element belongs, may be incident upon the short-size photo diode associated with the faulty LED element. However, in this case, the quantity of the incident light is small, so that the emission diagnosis can be made according to the same process as that carried out to deal with the presence of a faulty LED element.

The output of the photo electric transducer is applied to one input terminal D of the comparator 6, while a reference voltage obtained from dividing a source voltage by resistors $R_4$ and $R_5$ is applied to the other input terminal REF of the comparator 6. This reference voltage is set at a value between a minimum voltage (an absolute value) detected when all of plural LED elements simultaneously energized to emit light are normal and a maximum voltage (an absolute value) detected when any one of these LED elements is faulty. Therefore, when one or more of these LED elements is faulty, the detected voltage is lower than the reference voltage, and a binary output signal having a logic level "H" appears at the output terminal OUT of the comparator 6. On the other hand, when all of the LED elements are normal, a binary output signal having a logic level "L" appears at the output terminal OUT of the comparator 6.

The faulty LED element detection carried out in the manner described above by the use of the check data generated from the check data generator 1 is commonly performed separately from the image recording operation. Therefore, the switching unit S1 is provided so as to switch over the image data supplied from the input terminal IN and the check data supplied from the check data generator 1. Thus, the operation sequence is programmed so that, before the image recording mode is started by turning on the power supply or between the preceding image recording operation and the next, the switching unit S1 is switched to supply the check data to the driver circuit 2 so as to start the faulty LED element detection mode.

According to the first embodiment of the present invention, whether any one of a plurality of LED elements is faulty or not, can be diagnosed by one scanning step simultaneously energizing these LED elements. Therefore, the period of time required for the emission diagnosis of all the LED elements constituting the LED array can be greatly shortened. Further, because the short-size photo diodes 41, 42, 43, . . . , 4n are connected in series, the electrostatic capacity when viewed from the detection output terminals becomes small in an inversely proportional relation to the number of the short-size photo diodes, so that the response time of the outputs of the LED elements simultaneously energized in one scanning step can be accelerated. Therefore, because the period of time required for one scanning step simultaneously energizing the plural LED elements can be shortened, the period of time required for the emission diagnosis of all the LED elements constituting the LED array 3 can be further accelerated.

Figure 4:
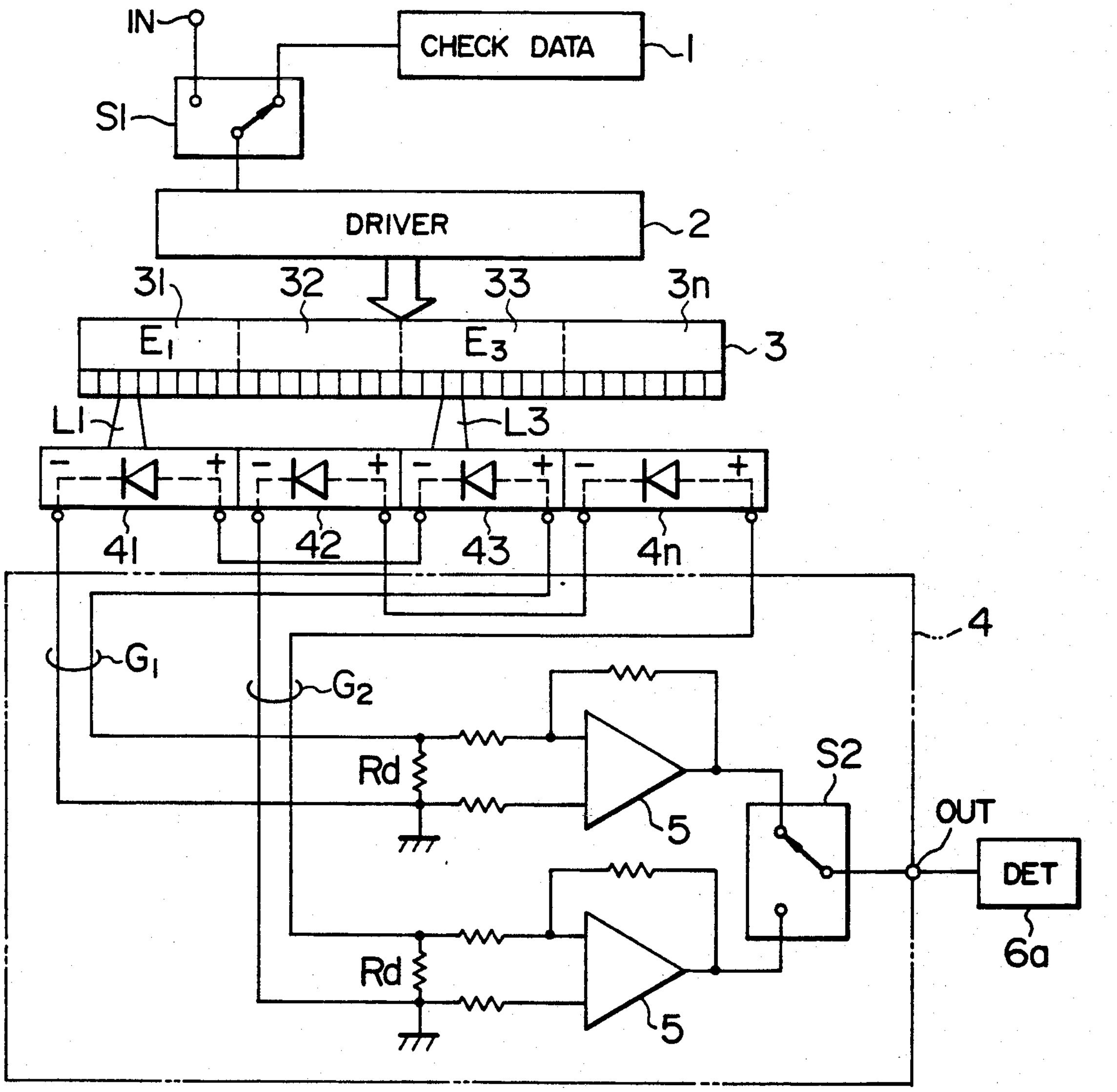
FIGS. 4, 5, 6 and 7 show a second, a third, a fourth and a fifth embodiment respectively of the present invention.

FIG. 4 shows a second embodiment of the present invention, and, in FIG. 4, like reference numerals are used to designate like parts appearing in FIG. 1. Referring to FIG. 4, the apparatus comprises a check data generator 1, a driver circuit 2, an LED array 3, a faulty LED element detector 4, a plurality of short-size photo diodes 41 to 4n, a pair of amplifiers 5 disposed in the faulty LED element detector 4, a decision circuit *6a*, an image data input terminal IN, a switching unit S1, and another switching unit S2 disposed in the detector 4. As in the case of the first embodiment, the LED array 3 is divided into a pluality of groups 31, 32, 33, . . . , 3n. However, this grouping is merely imaginary, and there is no hardware limitation in the structure of the LED array 3.

The faulty LED element detector 4 is associated with a photoelectric transducer which is composed of the plural short-size photo diodes 41, 42, 43, . . . , 4n arranged to correspond to the respective groups 31, 32, 33, . . . , 3n of the LED array 3. The short-size photo diodes located at positions where they do not receive light outputs from the LED element belonging to the other groups are grouped to form a plurality of groups G1 and G2 corresponding to the short-size photo diodes 41, 43 and 2, 44 as shown in FIG. 4. That is, the even-numbered short-size photo diodes 41, 43 and the odd-numbered short-size photo diodes 42, 44 are grouped into two groups. The short-size photo diodes 41, 43 belonging to the group G1 are electrically connected in series, and the output from this group G1 is applied to one of two detection resistors Rd. Similarly, the short-size photo diodes 42, 44 belonging to the group G2 are electrically connected in series, and the output from this group G2 is applied to the other detection resistor Rd. The short size photo diodes 41 to 4n so grouped cover the full length of the LED array 3 so that the light output from whatever LED element can be photoelectrically converted. The short-size photo diodes 41 to 4n may be disposed on one side only of the optical path when viewed from the focusing lens array 203 as shown in FIG. 3A, or their groups G1 and G2 may be disposed on the left and right sides respectively of the optical path when viewed from the focusing lens array 203 as shown in FIG. 3B.

The check data generator 1 generates check data for detecting whether or not the LED array 3 includes a faulty LED element, and this emission diagnostic operation is carried out separately from the image recording operation. As in the case of the first embodiment, the check data generator 1 generates the check data before the image recording mode is started by turning on the power supply or between the preceding image recording operation and the next. The switching unit S1 controls the data flow so that the check data can be supplied separately from image data supplied to the input terminal IN. The operation of this second embodiment is the same as that of the first embodiment in that the check data generator 1 repeats the scanning a plurality of times until all of the LED elements in the LED array 3 are energized to emit light. The scanning with the check data is such that a plurality of LED elements belonging to different groups corresponding to one photo diode group, for example, the LED elements $E_1$ and $E_3$ in the respective groups 31 and 33 corresponding to the photo diode group G1 are simultaneously energized in one scanning step, and such a manner of scanning is repeated until all of the LED elements in the groups corresponding to the photo diode group G1 are energized to emit light. Then, the similar manner of scanning is repeated for the LED elements belonging to the groups corresponding to the photo diode group G2, so that all of the LED elements in the LED array 3 are energized to emit light. When the number of the groups in the LED array 3 is increased, the number of the LED elements simultaneously scanned in one scanning step is increased. Therefore, the number of the scanning steps is decreased in an inversely proportional relation to the number of the groups, and the period of time required for the emission diagnosis can be correspondingly shortened.

As in the case of the first embodiment, the check data supplied to the drive circuit 2 in each scanning step is subjected to serial-parallel conversion, so that the LED elements are simultaneously energized to emit light according to the check data. For example, the LED elements $E_1$ and $E_3$ generate their light outputs $L_1$ and $L_3$ respectively in one scanning step.

The short-size photo diodes 41 and 43 belonging to the photo diode group G1 receive the light outputs $L_1$ and $L_3$ from the LED elements $E_1$ and $E_3$ respectively, and the associated detection resistor Rd detects the sum of the photovoltages. While the LED elements belonging to the groups corresponding to the photo diode group G1 are being diagnosed, the corresponding detection signal is outputted to an output terminal OUT through the switching unit S2. The diagnostic sequence is such that, as soon as the emission diagnosis for the LED elements belonging to the groups corresponding to the photo diode group G2 is started, the switching unit S2 switches over to the corresponding detection signal.

When any one of the LED elements scanned for the purpose of emission diagnosis is faulty, the associated short-size photo diode does not generate its output, and its internal impedance becomes high. As a result, a substantial output does not appear from the associated detection resistor Rd even when the remaining short-size photo diodes connected in series receive normal light outputs. That is, when the plural LED elements simultaneously energized to emit light do not include a faulty one, each of the photo diodes has a low internal impedance, and a high output is generated from each of the photo diodes in the photo diode group. On the other hand, when any one of the LED elements is faulty, its internal impedance is high, and no output appears from that photo diode in the photo diode group. This manner of photoelectric conversion is very convenient for the diagnosis for detecting the presence or absence of a faulty LED element. Thus, according to the above manner of photoelectric conversion, a binary signal representing the presence or absence of a faulty LED element appears at the output terminal OUT regardless of the number of faulty LED elements among the plural LED elements simultaneously energized.

The electrostatic capacity of the short-size photo diode group when viewed from detection output terminals is the combined value of the junction capacitances of the short-size photo diodes connected in series and becomes small in an inversely proportional relation to the number of the photo diodes. Therefore, the detection signal response time is quick, and the scanning can be made at a high speed.

The amplifiers 5 amplify the detection signals up to a level of about several volts so that the output signal of the faulty LED element detector 4 can be easily handled in the digital circuit 6a connected thereto.

According to the second embodiment of the present invention described above, a faulty LED element detector is connected to groups of short-size photo diodes 41, 42, 43, . . . , 4n connected in series to have a decreased effective electrostatic capacity, so as to operate at a high speed. Because such a detector is used to diagnose emission from a plurality of LED elements simultaneously energized, the period of time required for the emission diagnosis of all of the LED elements in the LED array 3 can be greatly shortened.

Further, in the emission diagnosis in which a plurality of LED elements are simultaneously energized to emit light, the light outputs from these LED elements are photoelectrically converted by the series-connected short-size photo diodes 41, 42, 43, . . . , 4n, and the faulty LED element detector generates a binary signal having a logic level indicating whether a specific LED element is faulty or not. Therefore, the second embodiment exhibits the merit that the structure of the circuit is simplified.

Figure 5:
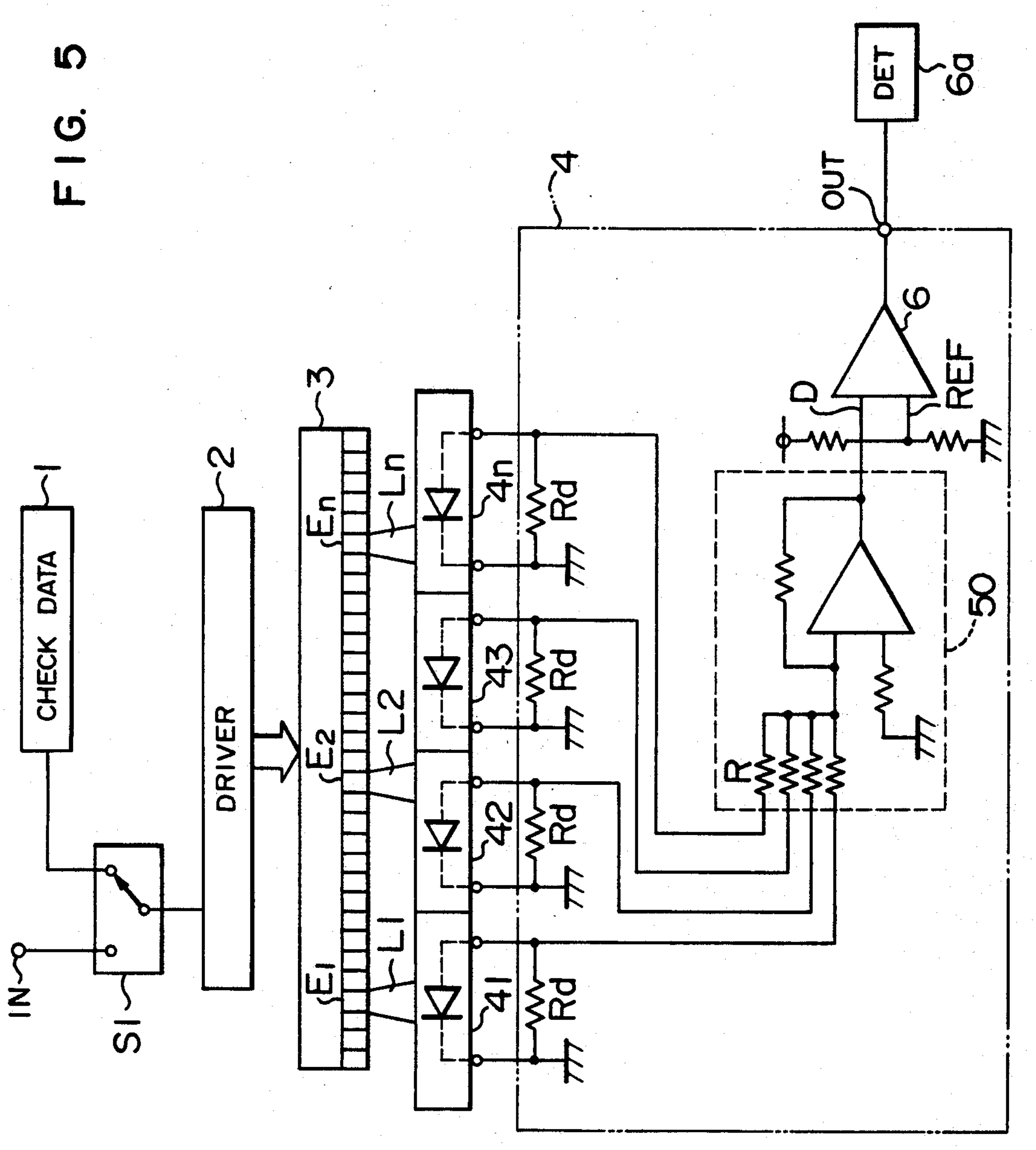

FIG. 5 shows a third embodiment of the present invention, and, in FIG. 5, like reference numerals are used to designate like parts appearing in FIG. 1. Referring to FIG. 5, the apparatus comprises a check data generator 1, a driver circuit 2, an LED array 3, a faulty LED element detector 4, a plurality of short-size photo diodes 41, 42, 43, . . . , 4n, an adder 50, a comparator 6, a decision circuit 6a, an image data input terminal IN, and a switching unit S1.

The check data generator 1 generates check data for simultaneously energizing a plurality of LED elements in the LED array 3. The check data generated in one scanning step is such that, for example, LED elements $E_1$, $E_2$, . . . , $E_n$ are simultaneously energized to emit their light outputs $L_1$, $L_2$, . . . , $L_n$ respectively. In the next scanning step, a plurality of other LED elements, the number of which is the same as that energized in the preceding scanning step, are simultaneously energized. In the manner described above, the check data generator 1 repeatedly generates check data so a to simultaneously energize a predetermined plurality of LED elements in each scanning step until all of the LED elements are energized to emit light. The switching unit S1 controls the data flow so that the check data can be supplied separately from image data supplied to the input terminal IN. As in the case of the first and second embodiments, the operation sequence is programmed so that, before the image recording mode is started by turning on the power supply or between the preceding image recording operation and the next, the switching unit S1 is switched to supply the check data so as to diagnose the emission from the LED elements.

The check data supplied to the driver circuit 2 in each scanning step is subjected to serial-parallel conversion, so that the LED elements are simultaneously energized to emit light according to the check data.

The plural short-size photo diodes 41, 42, 43, . . . , 4n apply their outputs representing the result of photoelectric conversion to the faulty LED element detector 4. These short-size photo diodes 41, 42, 43, . . . , 4n are arranged on one line on one side only of the optical path when viewed from the focusing lens array 203 as shown in FIG. 3A or arranged in a zig-zag relation straddling the optical path when viewed from the focusing lens array 203 as shown in FIG. 3B, so that they can receive the light outputs from the LED elements constituting the LED array 3. Thus, these short-size photo diodes 41, 42, 43, . . . , 4n are equivalent to a full-size photo diode. The photovoltages generated from these short-size photo diodes 41, 42, 43, . . . , 4n are applied across associated detection resistors Rd respectively to appear as detection signals which are applied to the adder 50 through associated input resistor R respectively. The adder 50 generates its output voltage proportional to the sum of the light outputs from normal ones of the plural LED elements simultaneously energized to emit light. Thus, the output voltage of the adder 50 represents the sum of the light outputs from the LED elements simultaneously energized in the LED array 3 in one scanning step, and the function of the short-size photo diode group is equivalent to that of the full-size photo diode. The detection signal response speed is determined by the junction capacitance of the photo diodes. Because this junction capacitance is estimated at 1/n (n: the number of the short-size photo diodes) of that of a signal full-size photo diode, the response speed is n times as high as that of the full-size photo diode. Therefore, the present invention is advantageous in that the period of time required for each scanning operation can be correspondingly shortened.

The output voltage of the adder 50 is applied to one input terminal D of the comparator 6. A reference voltage is applied to the other input terminal REF of the comparator 6. This reference voltage is set at a value between a minimum voltage (an absolute value) detected when all of plural LED elements simultaneously energized to emit light are normal and a maximum voltage (an absolute value) detected when any one of these LED elements is faulty. Therefore, when one or more LED elements are faulty, the detected voltage is lower than the reference voltage, and a binary output signal having a logic level "H" appears at the output terminal OUT of the comparator 6. On the other hand, when all of the LED elements are normal, a binary output signal having a logic level "L" appears at the output terminal OUT of the comparator 6.

According to this third embodiment of the present invention, the provision of a plurality of short-size photo diodes 41, 42, 43, . . . , 4n can accelerate the response of the photoelectric transducer, and a plurality of LED elements can be simultaneously diagnosed. Thus, the period of time required for the emission diagnosis for all of the LED elements can be shortened. Especially, in this third embodiment, the outputs from the photo detector units which may not have the same or uniform sensitivity are summed by an adder, so that an adverse effect attributable to a fluctuation of the sensitivities of the individual photo detector units can be minimized.

Although the outputs from the individual photo detector units are summed by the adder, such outputs may be separately derived to be separately identified.

Figure 6:
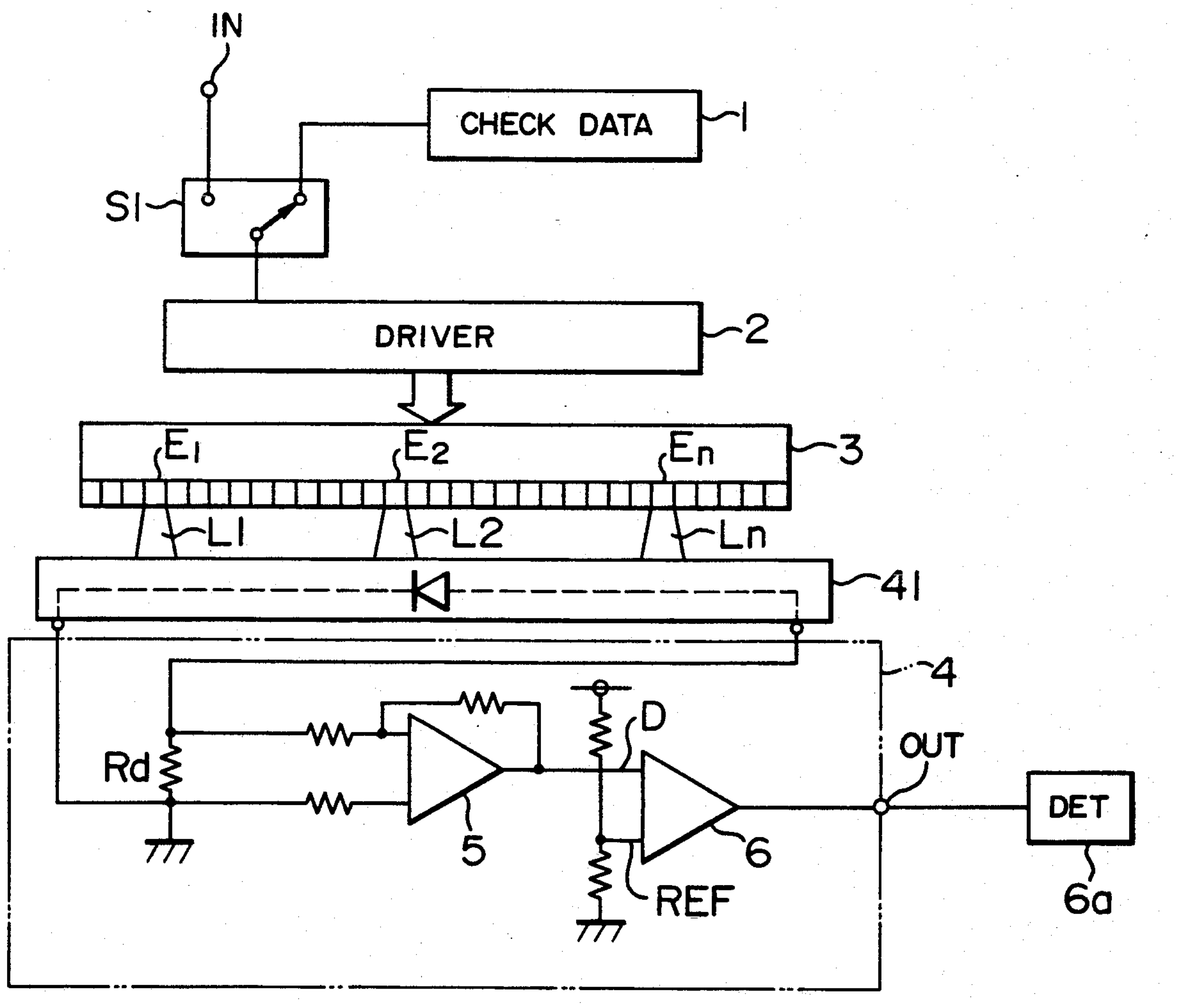

FIG. 6 shows a fourth embodiment of the present invention, and, in FIG. 6, like reference numerals are used to designate like parts appearing in FIG. 1. Referring to FIG. 6, the apparatus comprises a check data generator 1, a driver circuit 2, an LED array 3, a faulty LED element detector 4, a photo diode 41, an amplifier 5, a comparator 6, a decision circuit 6a, a switching unit S1, and an image data input terminal IN. The manners of generation of check data control of the data flow sequence and energization of LED elements in the LED array 3 are the same as those in the third embodiment described above. That is, when the check data generator 1 is actuated by turning on the power supply in each scanning step, a predetermined plurality of LED elements different from those energized in the preceding step are simultaneously energized to emit light.

The single photo diode 41 receiving the light outputs from these LED elements is electrically connected to the faulty LED element detector 4 which diagnoses whether or not one of the LED elements is faulty. This photo diode 41 has a full-size light receiving area so that it can receive the light output from any one of the LED elements in the LED array 3. This photo diode 41 is disposed at a position as shown in FIG. 3A. That is, the photo diode 41 is disposed at a position which is close to the LED array 3 but outside of the optical path 8 of light emitted from the LED array 3 to pass through the focusing lens array 203. The photo diode 41 generates a photovoltage proportional to the number of the light-emitting LED elements, and this photovoltage is applied across a detection resistor Rd to appear as a detection signal. The function and operation of the amplifier 5 and the comparator 6 are entirely the same as those described with reference to FIG. 1 showing the first embodiment. Therefore, when any one of the LED elements simultaneously energized to emit light is faulty, an error signal having a logic level "H" appears at the output terminal OUT of the comparator 6.

According to this fourth embodiment, too, a plurality of LED elements are simultaneously energized to emit light in each scanning step, so that all of the LED elements can be diagnosed within a short period of time.

Figure 7:
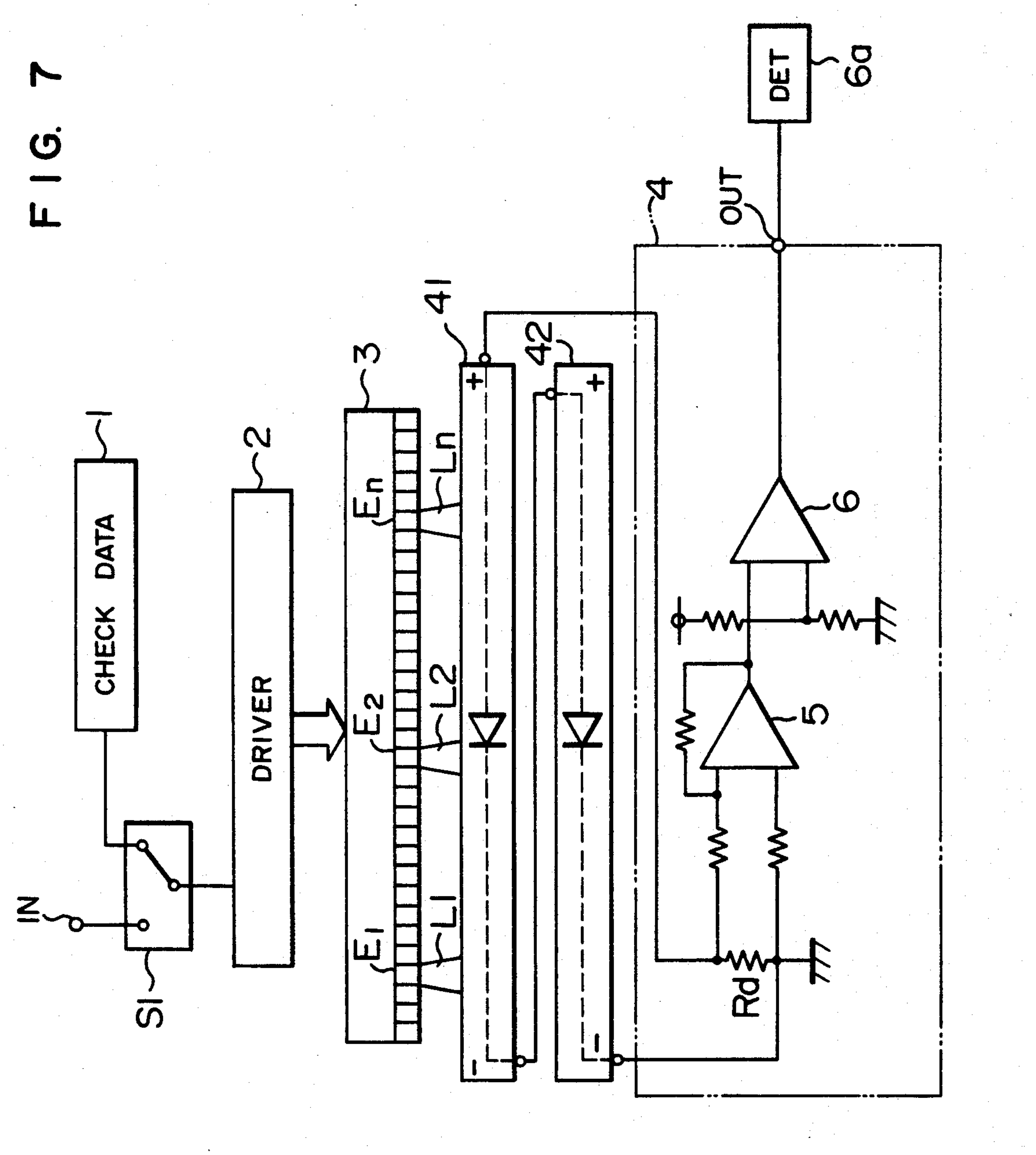

FIG. 7 shows a fifth embodiment of the present invention, and, in FIG. 7, like reference numerals are used to designate like Parts appearing in FIG. 6. Referring to FIG. 7, the apparatus comprises a check data generator 1, a driver circuit 2, an image data input terminal IN, a switching unit S1, an LED array 3, a faulty LED element detector 4, photo diodes 41, 42, an amplifier 5, an adder 50, a comparator 6, and a decision circuit 6a.

The operation of this fifth embodiment is entirely the same as that of the third and fourth embodiments described above in that check data generated from the check data generator 1 and supplied through the switching unit S1 and the driver circuit 2 simultaneously energize a predetermined plurality of different LED elements in each scanning step, and such a scanning operation is repeated until all of the LED elements are energized to emit light.

The two photo diodes 41 and 42 receiving the light outputs from the plural LED elements in each scanning step are electrically connected to the faulty LED element detector 4 which diagnoses whether or not any one of these LED elements is faulty. Each of these photo diodes 41 and 42 has a full size corresponding to the size of the LED array 3 as in the case of the photo diode 41 used in the fourth embodiment described above. The photo diode 41 corresponds to odd-numbered groups of LED array 3 and the photo diode 42 corresponds to even-numbered groups of LED array 3 and are disposed at positions close to the LED array 3 on both sides respectively of the optical path 8 when viewed from the focusing lens array 203 as shown in FIG. 3B. That is, these photo diodes 41 and 42 are disposed outside of the optical path 8 of light emitted from the LED array 3 to path through the focusing lens array 203, and receive the light emitted from the LED array 3. These two full-size photo diodes 41 and 42 are electrically connected in series to apply their outputs across a detection resistor Rd. Because of the above arrangement, the light outputs from the individual LED elements are received by the two full-size photo diodes 41 and 42, and the outputs of the photo diodes are summed. Therefore, the detection output voltage of the detection resistor Rd is two times as high as that obtained when the single photo diode is provided, so that the output voltage is substantially free from the adverse effect of a noise signal.

On the other hand, the composite junction capacitance of the photo diodes 41 and 42 connected in series is equivalently halved when viewed from the detection output terminals, so that the response speed for the light outputs from the LED elements becomes high.

The detection output signal from the detection resistor Rd is amplified up to a level of about several volts by the amplifier 5, and the amplified detection output signal from the amplifier 5 is applied to the comparator 6. When any one of the plural LED elements simultaneously energized is faulty, the comparator 6 generates an error signal as in the case of the first and fourth embodiments described above.

In the fifth embodiment, the photo diodes 41 and 42 can each be comprised of a plurality of photo diodes. In this case, the photo diodes 41 and 42 can be connected in any manner as shown in FIG. 1, FIG. 4 and FIG. 5.

Figure 8:
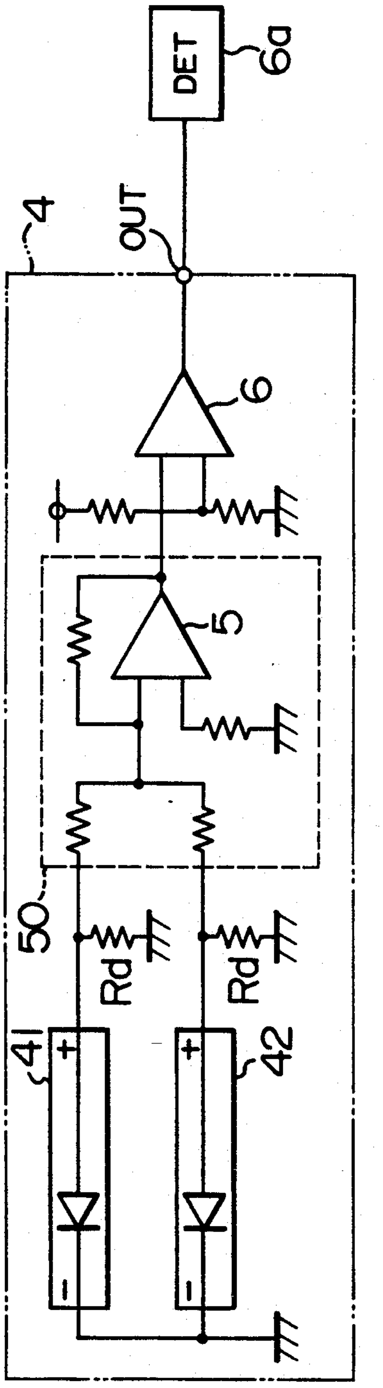
FIG. 8 shows a partial modification of the fifth embodiment of the present invention shown in FIG. 7.

FIG. 8 shows a modification of the faulty LED element detector 4 shown in FIG. 7. In the modification shown in FIG. 8, the full-size photo diodes 41 and 42 disposed on both sides respectively of the optical path 8 when viewed from the focusing lens array 203 as shown in FIG. 3B are electrically connected to the respective detection resistors Rd, and the detection output signals from these detection resistors Rd are summed by an adder 50. In this modification, too, the light outputs from the individual LED elements are received by the two full-size photo diodes 41 and 42, and the outputs of these photo diodes are summed. Therefore, the level of the detection output voltage from the adder 50 is two times as high as that obtained when the single photo diode is provided, so that the detection output signal is easily distinguished from a noise signal. In this case, the response speed of the detection output signal in response to the light outputs from the LED elements is the same as that obtained when the single photo diode is provided. Thus, the response speed is not lowered regardless of the increase in detection output voltage.

According to the embodiments shown in FIGS. 7 and 8, a plurality of LED elements are simultaneously energized for the emission diagnosis in each scanning step, so that the period of time required for the emission diagnosis of all of the LED elements in the LED array 3 can be shortened. Further, the light outputs from the LED elements are received by two full-size photo diodes to be summed, thereby doubling the detected light quantity. Therefore, the emission diagnosis can be carried out without being adversely effected by noise.

In each of the first, second, third, fourth and fifth embodiments of the present invention described above, the recording apparatus includes an LED array as a light source. However, it is apparent that the light emitter array used in the present invention is in no way limited to the LED array 3 and may be any one of, for example, an electroluminescence element array, a liquid crystal shutter array and a laser array. Also, a photoconductor device such as an image sensor may be used as a photo detector in lieu of the photo diode.

Further, although the LED array is divided into a plurality of groups beginning at one end thereof, it is apparent that the LED array may be randomly divided into such groups without any limitation in the positions of the groups.

Figure 9A:
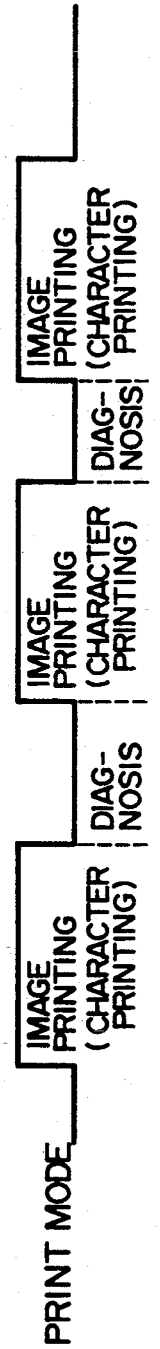
FIGS. 9A and 9B show two forms respectively of the diagnostic timing according to the present invention.
Figure 9B:
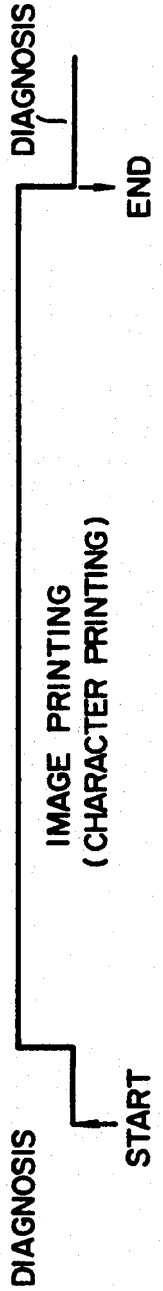
Figure 10:
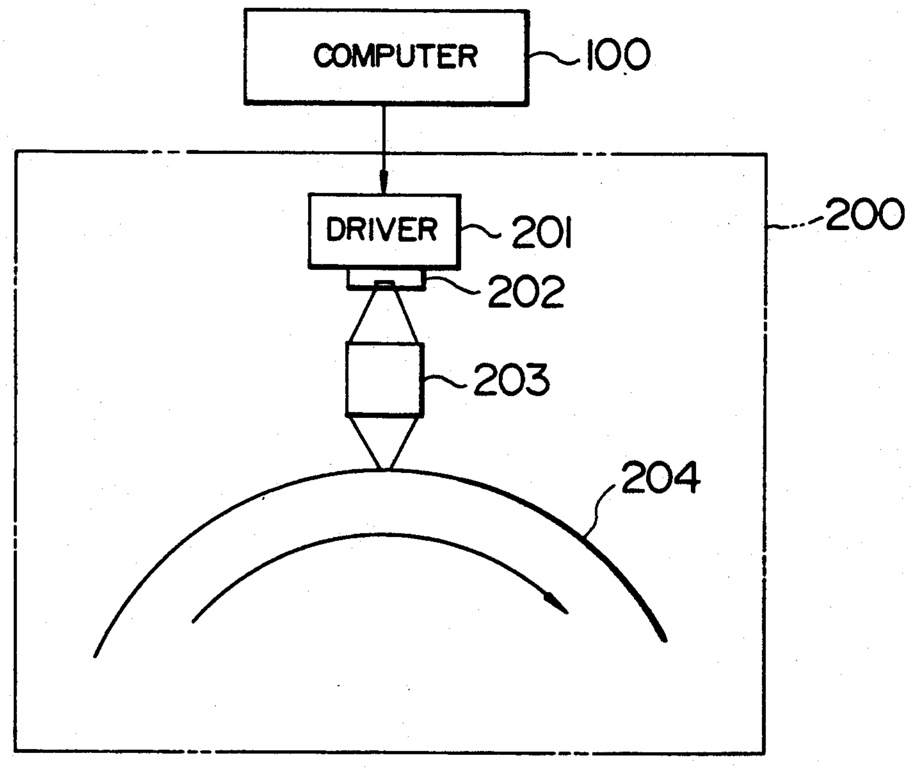
FIG. 10 PRIOR ART
FIG. 10 is a diagrammatic view generally illustrating the prior art involved in the present invention.

FIGS. 9A and 9B show two forms of the diagnostic timing, that is, the timing for switching the switching unit S1. FIG. 9A shows that the emission diagnosis is performed between a preceding image printing (or character printing) operation and the next. FIG. 9B shows that the emission diagnosis is performed at the starting time and ending time only of the image printing (or character printing) operation.

It will be understood from the foregoing detailed description of the present invention that a full-size photo diode is provided for an LED array or a plurality of short-size photo diodes which constitute an equivalent full-size photo diode are provided for an LED array so as to receive light simultaneously emitted from a plurality of LED elements and to photoelectrically convert the light outputs, so that the plural LED elements can be subjected to the emission diagnosis at a time. Therefore, the period of time required for the emission diagnosis of all of the LED elements constituting the LED array can be greatly shortened. Further, when the plural photo diodes are connected in series, the composite electrostatic capacitance becomes small, so that the photo response speed of the detection output signal is accelerated. Therefore, the plural LED elements can be scanned at a high speed in each scanning step for the emission diagnosis, so that the period of time required for the emission diagnosis of all of the LED elements constituting the LED array can be greatly shortened.

What is claimed is:

1. A light emitter array diagnostic apparatus for diagnosing whether or not a light emitter array including a plurality of light emitter elements is normally emitting light, said apparatus comprising:

a light emitter array unit including a plurality of light emitter elements divided into a plurality of groups of light emitter elements, each group of light emitter elements including at least two light emitter elements;

a check data generator unit for supplying predetermined check data to said light emitter array unit;

a photo detector unit disposed opposite to said light emitter array unit and including at least one photo detector element, each photo detector element receiving light emitted from each light emitter element of at least one of said groups of light emitter elements in response to said check data; and a diagnostic unit electrically connected to said photo detector unit for diagnosing whether or not at least one of said light emitter elements of each of said groups of light emitter elements is normally emitting light on the basis of the intensity of light emitted from said at least one of said light emitter elements of each of said groups of light emitter elements.

2. A light emitter array diagnostic apparatus according to claim 1, wherein said photo detector unit is a photoconductor device.

3. A light emitter array diagnostic apparatus according to claim 2, wherein said photoconductor device is an image sensor.

4. A light emitter array diagnostic apparatus according to claim 1, wherein said photo detector unit is a photo diode.

5. A light emitter array diagnostic apparatus according to claim 1, wherein said light emitter array unit and said photo detector unit are housed in a light shielding case extending in the longitudinal direction and having a longitudinal opening in which a focusing lens array is disposed so as to focus light emitted from said light emitter array unit, and said photo detector unit is located in said case in parallel to said light emitter array unit at a position outside of an optical path of the light transmitted through said focusing lens array.

6. A light emitter array diagnostic apparatus according to claim 5, wherein said light emitter array unit and said photo detector unit are single units disposed opposite to each other, and both ends of said photo detector unit have an output terminal.

7. A light emitter array diagnostic apparatus according to claim 1, wherein said photo detector unit comprises a plurality of photo detector elements each having output terminals.

8. A light emitter array diagnostic apparatus according to claim 7, wherein said plurality of photo detector elements are divided into a plurality of groups of photo detector elements, each group of photo detector elements including a plurality of photo detector elements connected in series via said output terminals, each group of photo detector elements having output terminals connected to said diagnostic unit.

9. A light emitter array diagnostic apparatus according to claim 8, wherein said diagnostic unit includes a switching unit for switching between signals output from said output terminals of said groups of photo detector elements.

10. A light emitter array diagnostic apparatus according to claim 7, wherein said diagnostic unit includes an adder for adding together signals output from said output terminals of said plurality of photo detector elements to produce a sum signal, and a comparator for comparing a reference signal with said sum signal.

11. A light emitter array diagnostic apparatus according to claim 1, wherein the check data causes one light emitter element of each of said groups of light emitter elements to simultaneously emit light while causing said light emitter elements of each of said groups of light emitter elements to sequentially emit light.

12. A light emitter array diagnostic apparatus for diagnosing whether or not a light emitter array including a plurality of light emitter elements is normally emitting light, said apparatus comprising:

a light emitter array unit including a plurality of light emitter elements;

a check data generator unit supplying predetermined check data to said light emitter array unit;

a photo detector unit disposed opposite to said light emitter array unit so as to receive light emitted from said light emitter elements energized according to said check data; and a diagnostic unit electrically connected to said photo detector unit so as to diagnose whether or not said light emitter elements are normally emitting light, said light emitter elements comprising said light emitter array unit being divided into a plurality of groups during emission diagnosis, and said diagnostic unit diagnosing the intensity of light emitted from at least one of said light emitter elements in each of said groups on the basis of light received by said photo detector unit;

wherein said check data generator unit supplies check data acting to cause simultaneous emission of light from at least one light emitter element belonging to each of said groups of said light emitter array unit.

13. A light emitter array diagnostic apparatus according to claim 12, wherein said photo detector unit comprises a plurality of photo detector units disposed opposite to said light emitter array unit, and said photo detector units are electrically connected in series with each other.

14. A light emitter array diagnostic apparatus according to claim 13, wherein said diagnostic unit includes a comparator comparing a reference signal (REF) with a signal appearing across said series-connected photo detector units.

15. A light emitter array diagnostic apparatus according to claim 14, wherein said diagnostic unit includes a decision circuit deciding that at least one of said light emitter elements belonging to said respective groups is faulty on the basis of the output signal from said comparator.

16. A light emitter array diagnostic apparatus for diagnosing whether or not a light emitter array including a plurality of light emitter elements is normally emitting light, said apparatus comprising:

a light emitter array unit including a plurality of light emitter elements;

a check data generator unit supplying predetermined check data to said light emitter array unit;

a photo detector unit disposed opposite to said light emitter array unit so as to receive light emitted from said light emitter elements energized according to said check data; and a diagnostic unit electrically connected to said photo detector unit so as to diagnose whether or not said light emitter elements are normally emitting light, said light emitter elements comprising said light emitter array unit being divided into a plurality of groups during emission diagnosis, and said diagnostic unit diagnosing the intensity of light emitted from at least one of said light emitter elements in each of said groups on the basis of light received by said photo detector unit;

wherein said light emitter array unit and said photo detector unit disposed opposite to said light emitter array unit, are housed in a light shielding case extending in the longitudinal direction, and having a longitudinal opening in which a focusing lens array is disposed so as to focus light emitted from said light emitter array unit, and said photo detector unit is located in said case in parallel to said light emitter array unit at a position outside of an optical path of the light transmitted through said focusing lens array; and wherein said photo detector unit comprises a plurality of photo detector units, and said photo detector unit corresponding to odd-numbered groups of said light emitter array unit disposed in the longitudinal direction of said case are located on one side of said optical path, while said photo detector unit corresponding to even-numbered groups of said light emitter array unit are located on the other side of said optical path.

17. A light emitter array diagnostic apparatus according to claim 16, wherein said check data generator unit supplies said check data acting to cause simultaneously emission of light from at least one light emitter element in each odd-numbered group of said light emitter array unit and in each even-numbered group of said light emitter array unit.

18. A light emitter array diagnostic apparatus according to claim 17, wherein each of the photo detector units corresponding to each odd-numbered group of said light emitter array unit has output terminals, and each of the photo detector units corresponding to each even-numbered group of said light emitter array having output terminals.

19. A light emitter array diagnostic apparatus for diagnosing whether or not a light emitter array including a plurality of light emitter elements is normally emitting light, said apparatus comprising:

a light emitter array unit including a plurality of light emitter elements;

a check data generator unit supplying predetermined check data to said light emitter array unit;

a photo detector unit disposed opposite to said light emitter array unit so as to receive light emitted from said light emitter elements energized according to said check data; and a diagnostic unit electrically connected to said photo detector unit so as to diagnose whether or not said light emitter elements are normally emitting light, said light emitter elements comprising said light emitter array unit being divided into a plurality of groups during emission diagnosis, and said diagnostic unit diagnosing the intensity of light emitted from at least one of said light emitter elements in each of said groups on the basis of light received by said photo detector unit;

wherein said light emitter array unit and said photo detector unit disposed opposite to said light emitter array unit, are housed in a light shielding case extending in the longitudinal direction, and having a longitudinal opening in which a focusing lens array is disposed so as to focus light emitted from said light emitter array unit, and said photo detector unit is located in said case in parallel to said light emitter array unit at a position outside of an optical path of the light transmitted through said focusing lens array;

wherein said light emitter array unit and said photo detector unit are single units disposed opposite to each other, both ends of said photo detector unit having output terminals; and wherein each of the photo detector units corresponding to each of the odd-numbered and even-numbered groups of said light emitter array unit are disposed on one side and the other side of said optical path in said case, respectively.

20. A light emitter array diagnostic apparatus according to claim 19, wherein said diagnostic unit includes a comparator comparing a reference signal (REF) with the sum of signals appearing from the output terminals of said photo detector units corresponding to said odd-numbered and even-numbered groups of said light emitter array unit.

* * * * *